United States Patent [19]

Higashida

[11] Patent Number: 5,990,976
[45] Date of Patent: Nov. 23, 1999

[54] VIDEO IMAGE PROCESSING APPARATUS AND THE METHOD OF THE SAME

[75] Inventor: Masaaki Higashida, Moriguchi, Japan

[73] Assignee: Matsushita Electric Industrial Co., Ltd., Osaka, Japan

[21] Appl. No.: 08/818,232

[22] Filed: Mar. 14, 1997

[30] Foreign Application Priority Data

Mar. 14, 1996 [JP] Japan ................................. 8-057455

[51] Int. Cl.⁶ .................................................. H04N 9/74
[52] U.S. Cl. ........................... 348/588; 348/564; 348/393
[58] Field of Search ................................... 348/588, 584, 348/564, 563, 568, 393, 395, 397, 398, 408

[56] References Cited

U.S. PATENT DOCUMENTS

| | | | |
|---|---|---|---|
| 4,905,077 | 2/1990 | Ishii | 348/588 |
| 4,931,872 | 6/1990 | Stoddard et al. | 348/584 |
| 5,329,369 | 7/1994 | Willis et al. | 348/568 |
| 5,343,250 | 8/1994 | Iwamura | 348/564 |
| 5,365,276 | 11/1994 | Imai et al. | 348/556 |
| 5,434,624 | 7/1995 | Ishimura | 368/563 |
| 5,717,705 | 2/1998 | Shikakura et al. | 348/466 |
| 5,790,204 | 8/1998 | Yamaguchi | 348/564 |
| 5,825,935 | 10/1998 | Murakoshi | 348/398 |
| 5,825,970 | 10/1998 | Kim | 386/109 |

FOREIGN PATENT DOCUMENTS

| | | |
|---|---|---|
| 44 02 447 | 8/1994 | Germany . |
| 7-203371 | 8/1995 | Japan . |
| 7-203373 | 8/1995 | Japan . |
| 93/17523 | 9/1993 | WIPO . |
| 94/22108 | 9/1994 | WIPO . |

*Primary Examiner*—Michael H. Lee
*Assistant Examiner*—Linus H. Lo
*Attorney, Agent, or Firm*—Ratner & Prestia

[57] ABSTRACT

A video image processing apparatus for processing compressed video image signals received at a speed of n for display on a video image display device. The apparatus comprises signal selecting circuits for selecting and passing components of a compressed video image signal from a specific frame or field, video image information memories for storing the components selected by the signal selecting circuits, a video image information control circuit for dividing the display screen of a video image display device into a plurality of regions, and controlling the video image information memories so that the components of the video image signal may be read in a sequence suitable for display, and a video image processing circuit for processing the video image information from the video image information memories for display on the video image display apparatus.

10 Claims, 8 Drawing Sheets

HORIZONTAL FREQUENCY →

| DC | AC1 | AC5 | AC6 | AC14 | AC15 | AC27 | AC28 |
|---|---|---|---|---|---|---|---|
| AC2 | AC4 | AC7 | AC13 | AC16 | AC26 | AC29 | AC42 |
| AC3 | AC8 | AC12 | AC17 | AC25 | AC30 | AC41 | AC43 |
| AC9 | AC11 | AC18 | AC24 | AC31 | AC40 | AC44 | AC53 |
| AC10 | AC19 | AC23 | AC32 | AC39 | AC45 | AC52 | AC54 |
| AC20 | AC22 | AC33 | AC38 | AC46 | AC51 | AC55 | AC60 |
| AC21 | AC34 | AC37 | AC47 | AC50 | AC56 | AC59 | AC61 |
| AC35 | AC36 | AC48 | AC49 | AC57 | AC58 | AC62 | AC63 |

VERTICAL FREQUENCY ↓

VIDEO IMAGE PROCESSING APPARATUS AND THE METHOD OF THE SAME

BACKGROUND OF THE INVENTION (a) Field of the invention

The present invention relates to a video image processing apparatus and the method of the same for reducing plural compressed video images, and displaying the plural reduced images simultaneously in divided portion on a same screen.

(b) Description of the Prior Art

At the present, when editing video materials taken, for example, by a video camera or the like in a broadcasting station or post-production, digitized video image is once stored and saved in a hard disk (HDD) of video editor or video server, and the so-called nonlinear editing is widely employed, that is, while monitoring the contents of video materials in the HDD, cuts are exchanged, inserted or deleted, and editing or transmission is done. In such editing work, for example, the video material recorded in a video cassette is read at high speed by a VTR, and the transfer time to the HDD is shortened.

FIG. 3 is a diagram showing an example of such editing application of video material.

In FIG. 3, reference numeral 301 is a video camera, 302 is a video cassette in which a video material is recorded by the video camera 301, and 303 is an n-times speed video player, which is a VTR capable of reading the video cassette 302 at a speed of n times of the normal speed. Reference numeral 305 is a video image processing apparatus. Reference numeral 306 is a video monitor. Reference numeral 304 is a nonlinear video editor having an HDD.

The video material taken by the video camera 301 is recorded in the video cassette 302. This video camera is read by the n-times speed video player 303, and is transferred at high speed into the HDD in the nonlinear video editor 304.

For transfer to the HDD, in order to shorten the transfer time, the n-times speed video player 303 capable of reading the video cassette 302 at a speed of n times of the normal read/write speed is employed. In the n-times speed video player, video image signals of n frames are read in an ordinary period of one frame. Such n-times speed video player 303 is easily realized by mounting n times of head of the number of ordinary reading magnetic heads on the cylinder of the VTR, and running the tape at n times of normal speed.

The operator of editing work, in order to monitor the content of the video material recorded in the video cassette 302 in the process of transfer of video image signal of the video material into the HDD in the nonlinear video editor 304 from the n-times speed video player 303, manipulates to display the content of the video image signal in the process of transfer of video image signal from the n-times speed video player 303 into the nonlinear video editor 304, on the video monitor 306 through the video image signal processing apparatus 305.

In the case of n-times speed reading, n times of video image signals of the normal reading data are obtained from the VTR. That is, video image signals of n frames are read in an ordinary period of one frame. Therefore, in order to display all frames of the video image signals being read on the video monitor 306, it is necessary to reduce the video image, and display the plural reduced images simultaneously in divided portions on one screen.

As the video image processing apparatus for reducing plural video images and displaying the plural reduced images simultaneously in divided portions on one screen (corresponding to the video image processing apparatus 305 in FIG. 3), for example, U. S. Pat. No. 5,434,624, Jul. 18, 1995 ("Apparatus for producing a multi-scene video signal" Tsuneaki Ishimura) is disclosed.

According to this publication, delay circuits for delaying an input video image signal and the address corresponding to this video image signal are provided, and their outputs are selectively passed and written into the memory, so that the video image is reduced and displayed.

Such prior art, however, involved the following problems.

When the plural input video images are compressed video image signals, for example, if compressed by using a DCT transform (Discrete Cosine Transform), the sample of the video image is the concept of the frequency, and when recorded in a VTR, VLC encoding or the like is employed, and therefore the concept of the address signal in the prior art is lost, and the method of the prior art cannot be employed.

If it is dared to apply the method of the prior art in the compressed video image, in the stage before input in the prior art, a circuit for expanding the compressed video image until becoming completely uncompressed is required, and the expander circuits are required as many as the number of input images, so that the circuit size becomes very large.

OBJECT AND SUMMARY OF THE INVENTION

The present invention is devised to solve the problems of the prior art, and it is hence an object thereof to present a video image processing apparatus capable of reducing plural video images in a very simple constitution, without adding circuits for expanding the compressed video images until the video image is completely uncompressed, if handling compressed video images, and also displaying the plural reduced images simultaneously in divided portions on one screen.

To achieve the object, the video image processing apparatus of the invention is a video image processing apparatus for processing compressed video image signals entered at a speed of n times and supplying into a video image display device, comprising means for dividing the display screen of the video image display device into n regions, means for allocating fundamental video image information of compressed video image signals for n frames or n fields entered at a speed of n times into n divided regions, and means for generating video image signals for displaying in n divisions.

The invention also presents a video image processing apparatus comprising n signal selecting circuits for selecting and passing fundamental video image information of compressed video image signal in a specific frame or field, from compressed video image signals entered at a speed of n times, n fundamental video image information memories for storing the fundamental video image information selected by the n signal selecting circuits, a fundamental video image information control circuit for dividing the display screen of a video image display device into n regions, and controlling the n fundamental video image information memories so that the fundamental video image information may be read in a sequence suited to display of the fundamental video image information stored in the n fundamental video image information memories in the n divided regions, and a video image processing circuit for processing the fundamental video image information delivered from the n fundamental video image information memories so as to be suited to the video image display apparatus.

DETAILED DESCRIPTION

An embodiment of the invention is described in detail below by referring to the accompanying drawings.

In the invention, a video material of compressed image is handled. The invention is applicable to all cases of compression in frame unit, compression in field unit, and mixed compression in frame unit and field unit, and the example of processing in frame unit is shown in this embodiment.

First, the image compression method in the embodiment is described. The image compression is described, for example, by Anil K. Jain in "Fundamentals of Digital Image Processing," published by Prentice-Hall International Edition.

Among various image compression methods, the method applied in the apparatus for storing (recording) video image includes the discrete cosine transform (DCT) method, for example, as the image compression method by orthogonal transform.

In the embodiment of the invention, the image compression by DCT method is explained as an example of image compression method.

The compression by the DCT method is employed in the international standard rules such as MPEG, JPEG, and H261, and in the digital VTR, it is used in the DVCPRO-VTR, as mentioned in the Proceedings published by the Society of Motion Picture and Television Engineers (SMPTE), 137th SMPTE Technical Conference and World Media Expo, MOVING IMAGES: MEETING THE CHALLENGES, Sept. 6–9, 1995, pp. 196–230, "DVCPRO: A Comprehensive Format Overview," and many related books have been published.

According to the image compression by the DCT method, in short, pixel values (for example, luminance) distributing randomly before transform are concentrated into large values in low frequency components after transform, and the quantity of information is reduced on the whole by reducing the quantity of the information of high frequency components by quantizing.

In particular, in this embodiment of the invention, the image compression method of the DVCPRO-VTR standard is mainly explained.

In the embodiment, the video signal before image compression refers to an example of so-called "4:1:1 component signal," which is prepared by curtailing two color difference signals to reduce the sampling frequency to half, among the data of luminance signal Y signal), and two color difference signals, (R[]Y) signal (Cr signal) and (B-Y) signal (Cb signal), of 525 lines/60 Hz of "4:2:2 component signal" in Recommendation 601 of CCIR (International Radio Consultative Committee, now called ITU-RS, International Telecommunication Union-Radiocommunication Sector). In the embodiment, therefore, sample pixels in one frame consist of 720 pixels in the horizontal direction and 480 pixels in the vertical direction as for Y signal, and 180 pixels in the horizontal direction and 480 pixels in the vertical direction as for Cb signal and Cr signal.

In the embodiment, the DCT compression blocks (DCT blocks) are 8×8 (8 lines×8 pixels).

Figure 4:
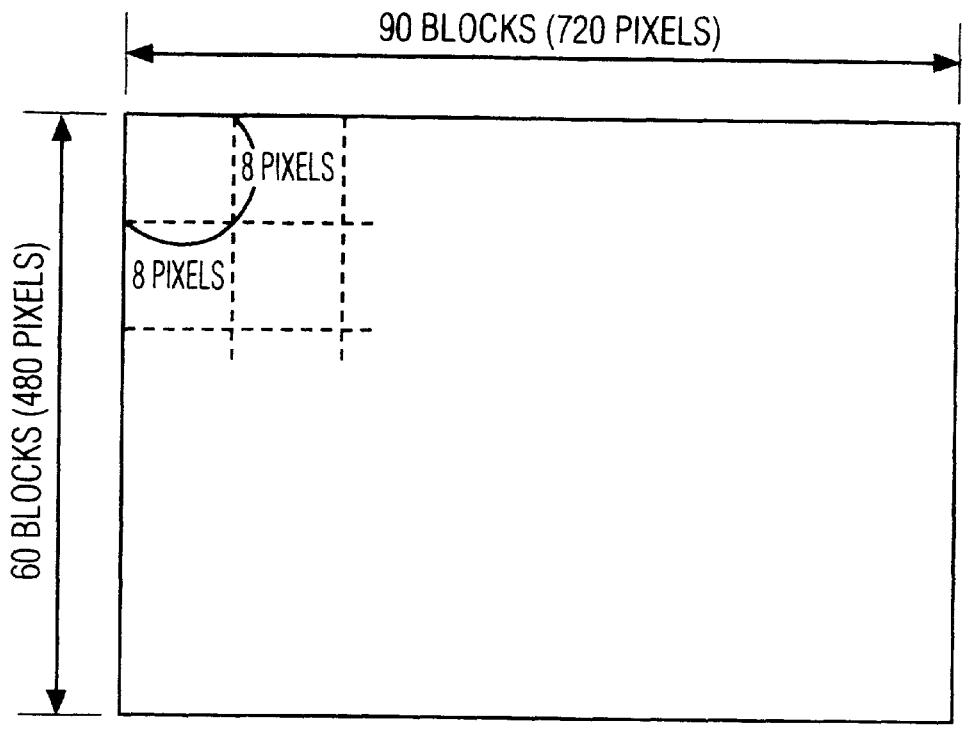
FIG. 4 is a conceptual diagram of division of Y signals of one frame into DCT blocks.

FIG. 4 is a conceptual diagram of division of Y signals in one fame into DCT blocks. Dividing into DCT blocks in the unit of 8 pixels, one frame is divided into 90 blocks in the horizontal direction and 60 blocks in the vertical direction, totaling to 5400 blocks.

Figure 5:
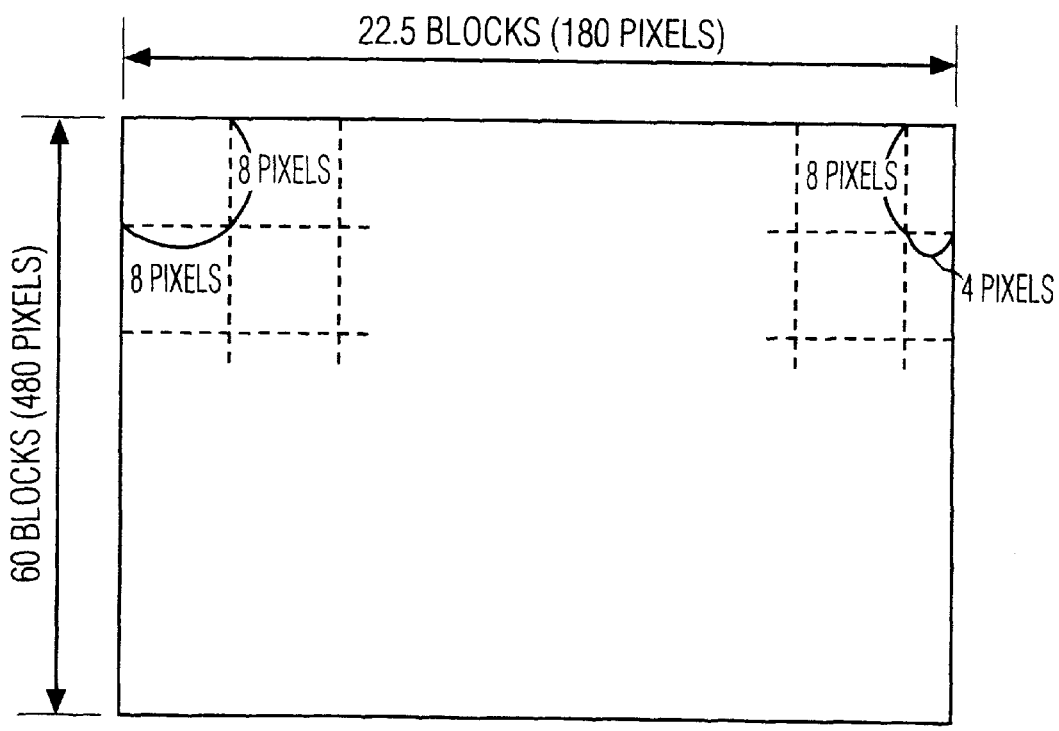
FIG. 5 is a conceptual diagram of division of Cb signals and Cr signals of one frame into DCT blocks.

FIG. 5 is a conceptual diagram of division of Cb signals and Cr signals in one frame into DCT blocks. Dividing into DCT blocks in the unit of 8 pixels, one frame is divided into 225 blocks in the horizontal direction and 60 blocks in the vertical direction.

If divided into 8 pixels each in the horizontal direction, fractions of 4 pixels are left over at the right end.

Figure 6:
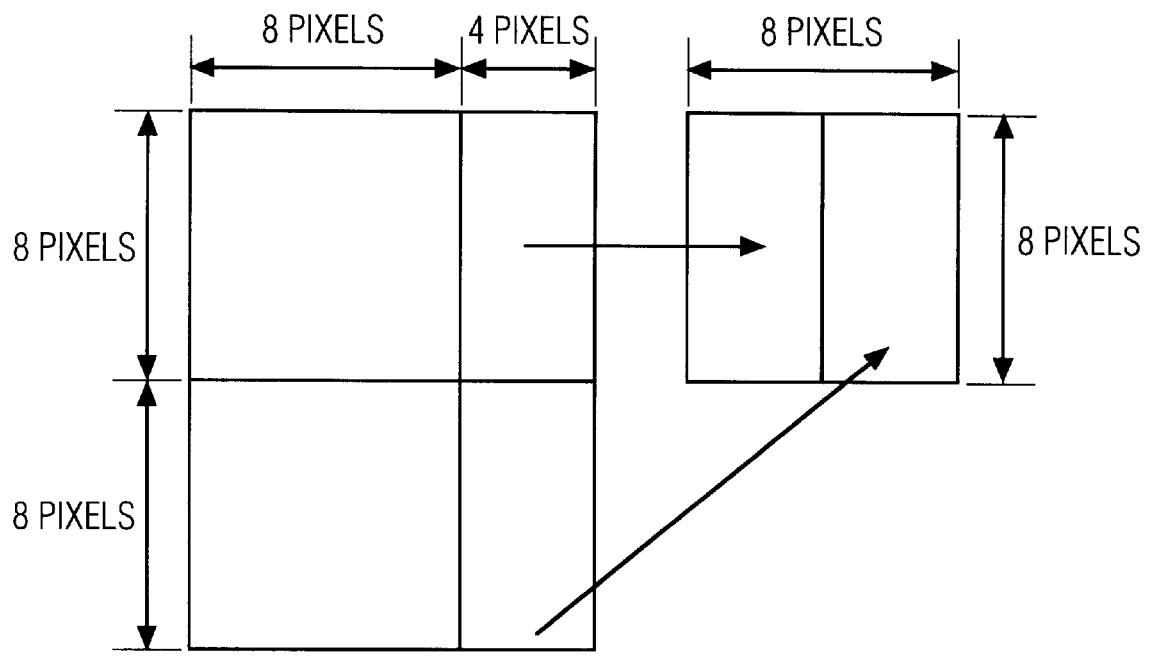
FIG. 6 is a conceptual diagram of processing method of fractions of DCT block divisions of Cb signals and Cr signals.

FIG. 6 is a conceptual diagram of processing method of factions of division of Cb signals and Cr signals into DCT blocks. As shown in FIG. 6, upper and lower adjacent blocks of a block of 4 pixels×8 pixels are rearranged by shifting the upper block to the left and the lower block to the right, and a block of 8 pixels×8 pixels is combined.

In the method shown in FIG. 5 and FIG. 6, the Cb signal and Cr signal are respectively divided into 1350 blocks.

After being divided into DCT blocks, the Y signal, Cb signal, and Cr signal undergo DCT transform.

Figures 2, 3:
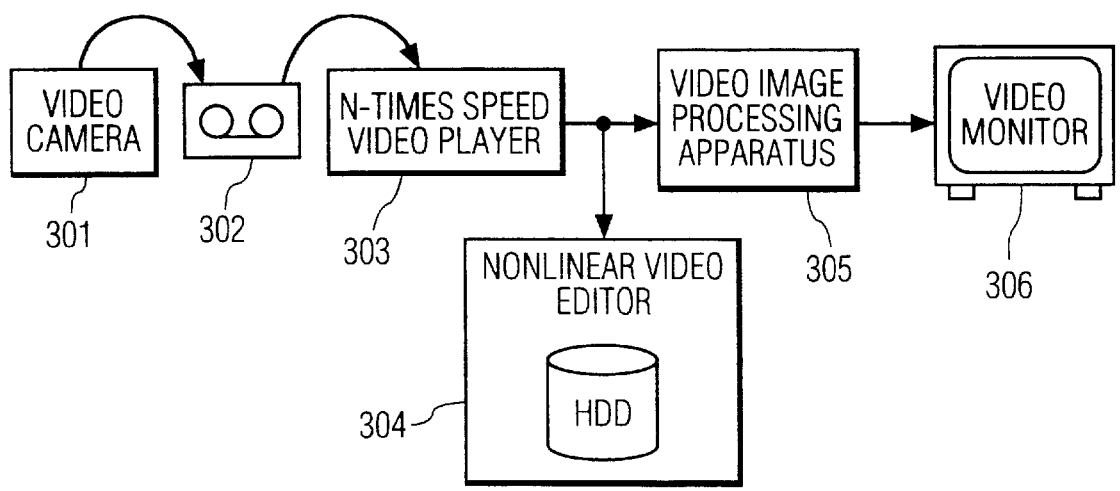
FIG. 2 is a conceptual diagram showing data after DCT transform of DCT blocks in the same embodiment.
FIG. 3 is a diagram showing an application example of editing of video material in a prior art.

FIG. 2 is a conceptual diagram showing data after DCT transform of DCT blocks in this embodiment. In FIG. 2, DC denotes a direct current component (DC component) after DCT transform, and AC1,AC2, . . . , AC63 are alternating-current components (AC components). Since 8×8 DCT blocks are DCT transformed, there are 64 components in total of DC components and AC components. As indicated by arrow in FIG. 2, the AC component is heightened in the frequency component as going in the right direction as for the horizontal frequency, and going downward as for the vertical frequency. That is, as going apart from the DC, the AC component becomes higher in frequency.

In the data divided into frequency components by DCT transform, the DC component is most fundamental and important data as the video image, and the AC component has a fundamental video image component at lower frequency, and has a specific information of video image at higher frequency.

The AC components after DCT transform are quantized and encoded while scanning zigzag from low frequency component to high frequency component in the sequence of AC1, AC2, . . . , AC63. The coefficient after DCT transform is video image information, and the DC component has the largest information quantity, and the information quantity decreases gradually from the low frequency component to high frequency component of AC component. After quantizing, the information undergoes variable-length encoding, such as two-dimensional Huffmnan encoding.

After quantizing and variable-length encoding, in most cases, the high frequency component of AC component becomes zero, and components of a certain block, for example, become DC, AC1, AC2, . . . AC40. How far the high frequency components exit depends on the video image of each block.

As described herein, the method of compressing and recording video image data by DCT transform, zigzag scanning, quantizing and variable-length encoding is employed as a common art for those skilled in the art, in the video image recording apparatus, for example, the digital VTm, nonlinear video editor, and video server.

An important point about the nature of the invention is that the DC component of the DCT transformed data has the most important information as the video image data, while the AC component has more important information at lower frequency next to the DC component. In other words, for the purpose of expressing the rough information of video image, for example, for checking the video image when played at n times speed, it is enough with fundamental information only. More specifically, for the sake of such purpose, as far as all frames or all fields are displayed, it is enough with the DC component information only, and if using AC components, it is enough to use low frequency components only. The invention is based on this point.

Another important point about the nature of the invention, as in compression by DCT, by representing each DCT block of a video image compressed by composing, for example, 8×8 DCT blocks, by DC component only, since blocks of 64 pixels are reduced to 1 pixel, the invention is realized without particularly installing reduction circuit for pixel curtailing or the like.

In the embodiment, in a total of 518400 samples per frame consisting of 720×480 samples of Y signal, and 180×480 samples each of Cb signal and Cr signal, DCT blocks are 5400 blocks in Y signal, and 1350 blocks in Cr signal and Cb signal each, resulting in 518400:(5400+1350×2), or reduction of 1/64.

Besides, when using the DC component and part of AC components, for example, DC component, AC1 and AC2, by expanding only in the corresponding parts, 2×2 pixels are composed, resulting in reduction of 1/16(4/64).

According to the principle of the embodiment, as far as all frames of n times speed playing are displayed, it is enough to check the content if the video image quality is lowered somewhat in each frame, and by the n-times speed video player, all frames of compressed video image of n frames played in the period of one frame are displayed, but by showing only the fundamental video image information in each frame on the display, all frames can be displayed on the display device in a simple constitution even in n-times speed playing, so that the content of the video material can be checked.

In the embodiment, the fundamental video image information is only the DC component of DC component and AC component of the video image data compressed by DCT transform. Of course, depending on the required resolution, part of low frequency component of AC component may be also used.

The reduction effect is also obtainable when DC component and a part of AC component are used. For example, when DC component and three constituents from low-frequency AC component adjacent to DC component in matrix are used, a DCT block of 8×8 is reduced to 2×2; which means that the reduction effect is 4/64. Also in this case, the present invention is feasible without providing an additional reducing circuit such as pixel curtailer, compared to the case when the entire AC component is used.

A mode of video image display by using DC component is described below by referring to the drawing. Hereinafter, the fundamental video image displayed by using DC component is called a thumb nail image.

In the embodiment, the video material is compressed by the DCT method. In the DCT method, usually, the greatest electric power is concentrated in the DC component. In the AC component, the electric power is concentrated at lower frequency, and the electric power is smaller at higher frequency.

Referring now to FIG. 2, DC is most important as data, and next those closer to DC, for example, AC1, AC2, AC3 (or AC1, AC2, AC4) are important, and the degree of importance is lower as going apart from DC.

Figure 7:
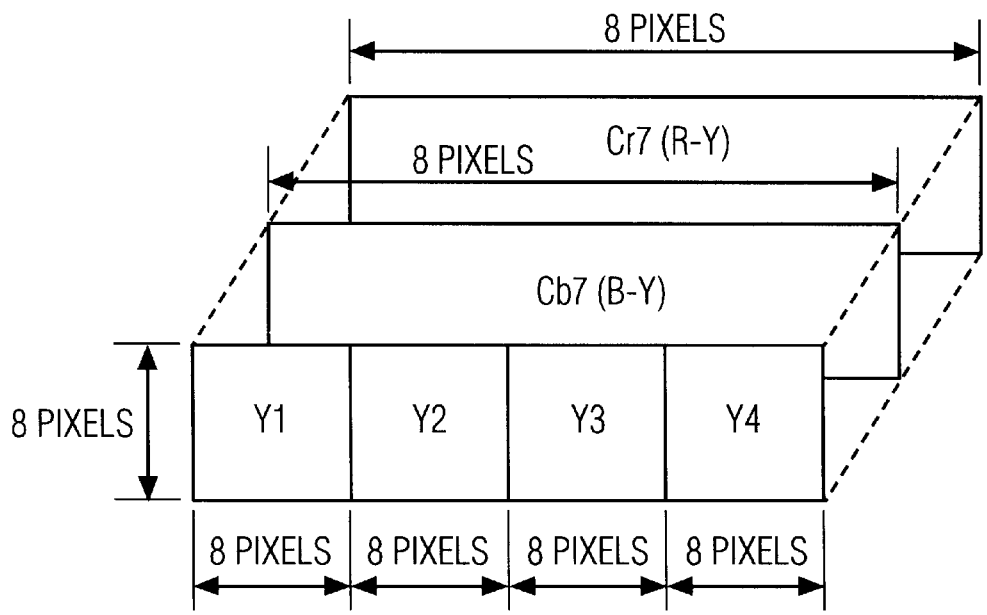
FIG. 7 is a conceptual diagram of fundamental blocks of thumb nail image display by DC component

FIG. 7 is a conceptual diagram of fundamental block of thumb nail image display by DC component.

The thumb nail image display consists mainly of four DCT blocks of Y signal adjacent in the horizontal direction, and one DCT block each of Cb signal and Cr signal, that is, a total of six blocks of Y signal, Cb signal, and Cr signal.

More specifically, Y1, Y2, Y3, Y4 are DC components (average of 8×8 pixels) of four DCT blocks of Y signal adjacent in the horizontal direction. Cb7 and Cr7 are DC components of Cb signal and Cr signal of same sampling point. Since Y signal has four times of samples in the horizontal direction as compared with Cb signal and Cr signal, they are equal to DC components of four blocks from Y1 to Y4 in FIG. 7 in the points on the screen of one block each of CB and Cr (on the thumb nail image). Hereinafter, the blocks shown in FIG. 7 are called DC blocks.

A thumb nail image is displayed in a form of laying up DC blocks on the screen.

Figures 8B, 8C:
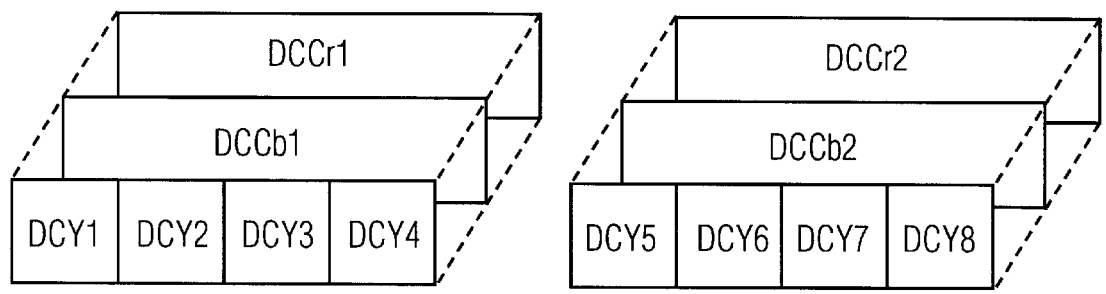
FIGS. 8A–8C are conceptual diagrams of display method of thumb nail image.
Figure 8A:
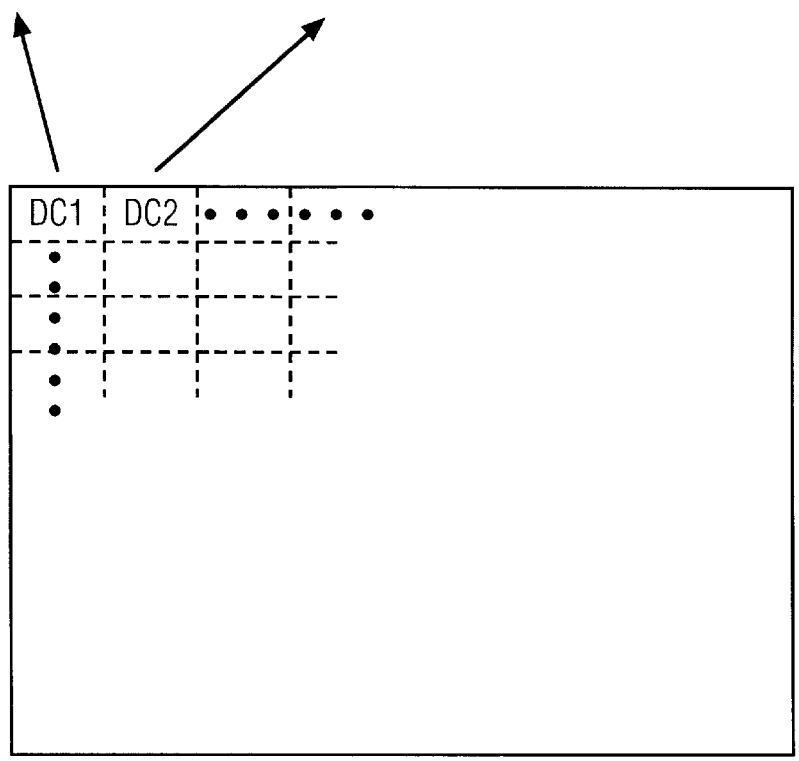

FIG. 8 is a conceptual diagram of display method of thumb nail image. FIG. 8A shows one thumb nail image. The thumb nail image is composed of plural DC blocks, as indicated by DC1, DC2, . . . in FIG. 8A. DC1, DC2, . . . are DC blocks as explained in FIG. 7, and DCT is composed of, like the DC block shown in FIG. 8B, four DC components of Y signal, DCY1, DCY2, DCY3, DCY4, and two DC components of color difference signal, DCCb1 (DC component of Cb signal), DCCr1 (DC component of Cr signal). Similarly, DC2 is composed of, like the DC block shown in FIG. 8C, four DC components of Y signal, DCY5, DCY6, DCY7, DCY8, and two DC components of color difference signal, DCCb2 (DC component of Cb signal), DCCr2 (DC component of Cr signal). In this way, the DC blocks are laid up and the thumb nail image is composed.

As for 8×4 blocks of Cb signal and Cr signal at the right end of the screen, a DC block is composed of two DCT blocks of Y signal, and one DCT block each of Cb signal and Cr signal.

A specific constitution of the embodiment is described in detail below by referring to the drawings.

Figure 1:
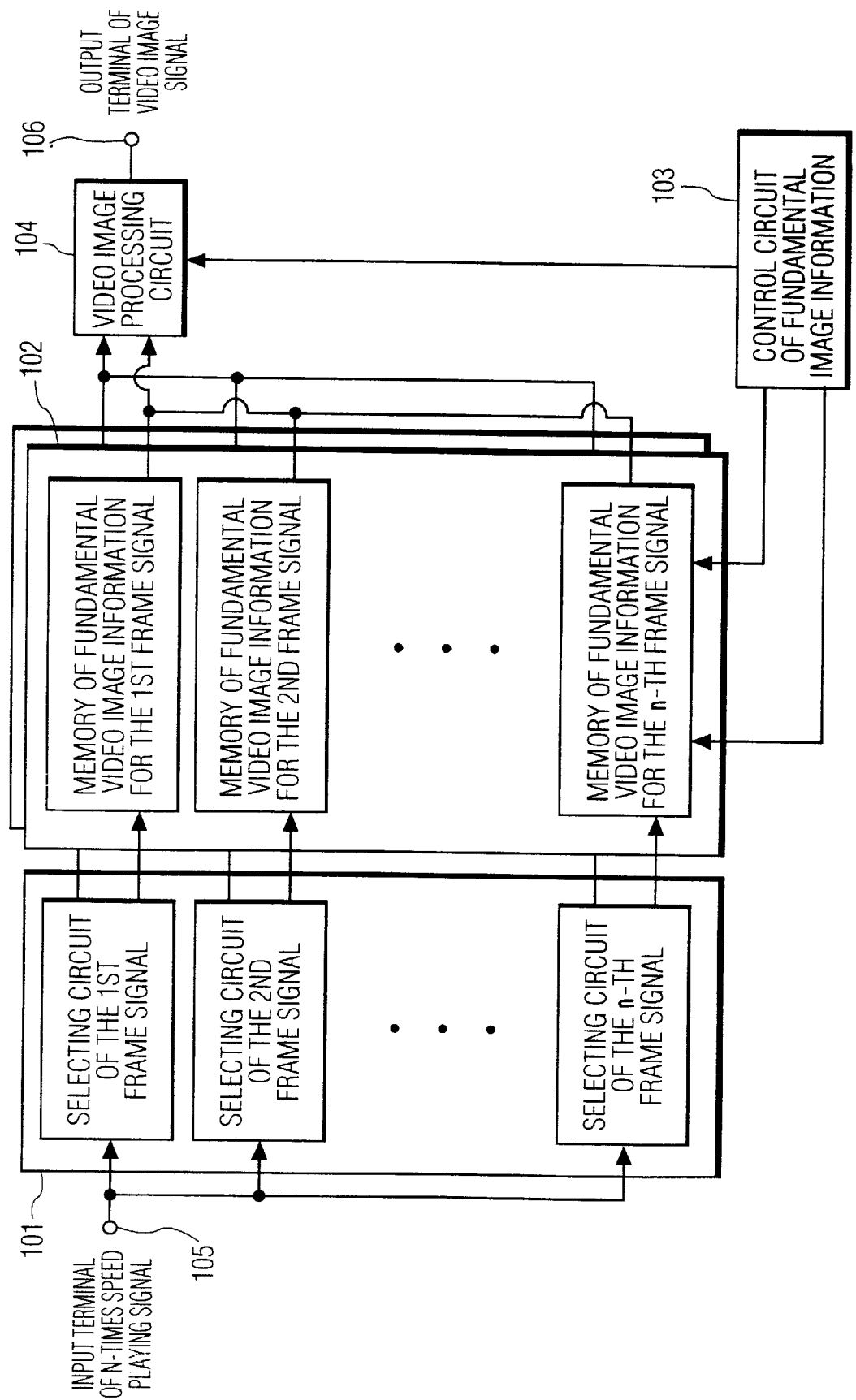
FIG. 1 is a block diagram showing a schematic constitution of a video signal processing apparatus in an embodiment of the invention.

FIG. 1 is a block diagram showing a schematic constitution of a video image processing apparatus in an embodiment of the invention. In FIG. 1, reference numeral 101 is an array of signal selecting circuits, 102 is an array of fundamental video image information memories, 103 is a control circuit of fundamental video image information, and 104 is a video image processing circuit.

Figure 9:
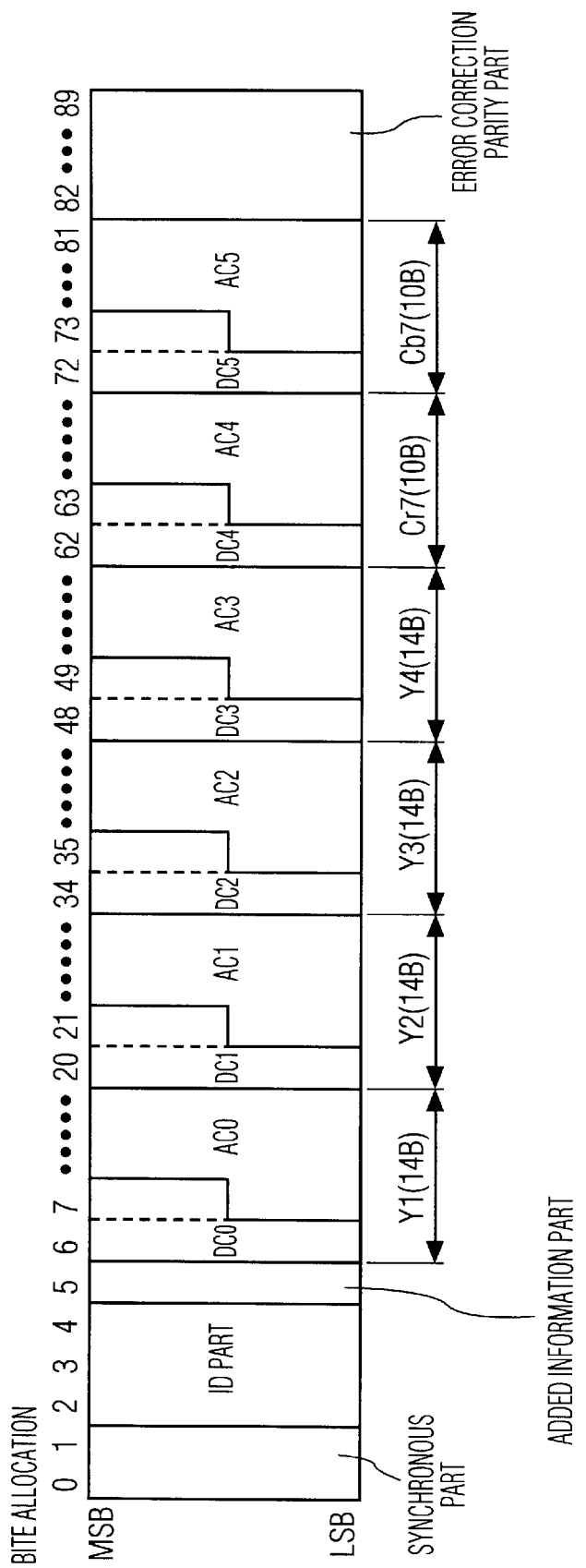
FIG. 9 is a diagram showing a transmission format of playing signal in the embodiment.

FIG. 9 is a diagram showing an example of transmission format of playing signal in this embodiment. FIG. 9 shows a transmission format of one synchronous block.

In this embodiment, a synchronous block is composed in the unit of fundamental block shown in FIG. 9. From the beginning of each synchronous block, a two-byte synchronous part for synchronizing the transmission, a three-byte ID part for expressing the index of each block, a one-byte added information part containing information such as playing error of each block, and compressed video image information are transmitted in this sequence. Further, at the end of the synchronous block, an error correction parity part is transmitted as a parity for error correction.

As the compressed image information, four pieces of compressed video image information of Y signal consisting of 14 bytes each, and compressed image information of Cr signal and Cb signal consisting of 10 bytes each are transmitted sequentially.

The symbols indicated below arrow at both ends in FIG. 9 correspond to Y1, Y2, Y3, Y4, Cr7, and Cb7 in FIG. 7, respectively.

In Y signal, Cr signal, and Cb signal, a total of 12 bits consisting of higher four bits at the beginning byte and next byte of each block are DC signals.

In the video cassette 302 in FIG. 3, video image signals are recorded in a multiple consecutive form of synchronous blocks in FIG. 9, and as playing signals from the n-times speed video player 303, multiple synchronous blocks shown in FIG. 9 are transmitted consecutively, and playing signals of n frames are transmitted in the period of one frame. Consequently, the data is entered from the input terminal 105 of n-times speed playing signal. At the moment of input in the input terminal 105 of n-times speed playing signal, error has been already corrected.

The transmission sequence of each frame of compressed video image signal of n frames played in the period of one frame (transmission sequence of each frame played parallel) has been already determined.

In FIG. 1, the array of signal selecting circuits 101 comprises n signal selecting circuits. In the array of signal selecting circuits 101, blocks are synchronized on the basis of detection of synchronous part of synchronous blocks A synchronous block counter for counting synchronous blocks is provided. This synchronous block counter is reset at the beginning of n-times speed playing signal, and thereafter synchronous blocks of n frames played in the period of one frame are counted. The array of signal selecting circuits 101 also comprises a synchronous block internal counter for counting the inside of the synchronous blocks, being reset at the beginning of synchronous blocks. That is, the synchronous block internal counter is a counter for counting up the inside of synchronous blocks from 0 to 89.

Each signal selecting circuit selectively passes only the DC component of the frame to be selected by the circuit on the basis of the value of the synchronous block counter, and transfers to the array of fundamental video image information memory 102. For example, a selecting circuit of first frame signal transfers only the DC component of a specific synchronous block, only when this synchronous block of the first frame signal is entered from the input terminal 105 of n-times speed playing signal on the basis of the value of the synchronous block counter, to a memory of fundamental video image information for the first frame signal in the array of fundamental video image information memories 102. Thereafter, a selecting circuit of the second frame signal, . . . , a selecting circuit of the n-th frame signal similarly transfer only the DC component of the synchronous block to the array of fundamental video image information memories 102 only when the synchronous block of the frame to be selected by the circuit is entered from the input terminal of n-times speed playing signal.

The operation of the array of signal selecting circuits 101 and array of fundamental video image information memories 102 is specifically described below by referring to FIG. 9 and FIG. 11.

Figure 11:
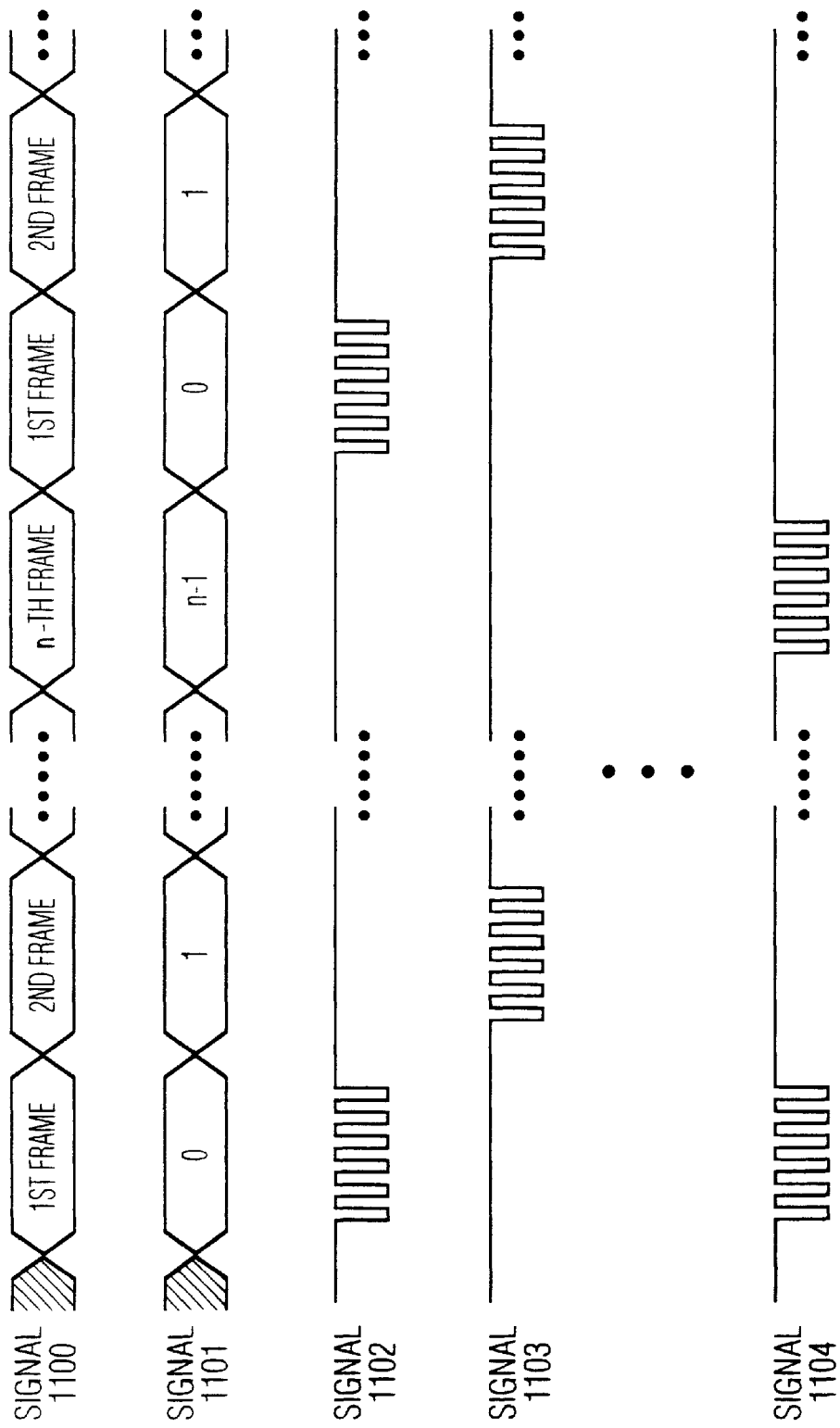
FIG. 11 is a timing chart for showing the operation of an array of signal selecting circuits in the embodiment.

FIG. 11 is a timing chart showing the transmission sequence of synchronous blocks of each frame in n frames transmitted in the period of one frame, and the operation of synchronous block counter and array of signal selecting circuits 101.

In this embodiment, the compressed video image signals of n frames played parallel in the period of one frame are transmitted by repeating the sequence of first frame, second frame, . . . , n-th frame as indicated by signal 1100.

The signal 1101 shows the operation of the synchronous block counter provided in the array of signal selecting circuits 101. The synchronous block counter is reset to 0 at the beginning of a frame period, and is counted up in every 1350 synchronous blocks, and repeats the sequence of returning to 0 after n−1.

A signal 1102 shows the concept of operation of the selecting circuit of the first frame signal. The selecting circuit of the first frame signal detects whether the signal entered in the input terminal 105 of n-times speed playing signal is a first frame or not, from the value of the synchronous block counter shown in the signal 1101, and further decodes the value of the counter in the synchronous block, and generates a signal 1102 which becomes negative in logic only when the DC component of the synchronous block of the first frame is entered in the input terminal 105 of n-times speed playing signal.

That is, the signal 1102 has a negative logic only when the value of the synchronous block counter shows the first frame (the value of the synchronous block counter is 0), the value of the counter in the synchronous block is at byte 6, 7, 20, 21, 34, 35, 48, 49, 62, 63, 72 or 73 as shown in FIG. 9.

The signal 1102 serves both as selection permit signal of the selecting circuit of the first frame signal (permitting passing of signal in negative logic), and as write permit signal into the memory of fundamental video image information for the first frame signal (write enable for permitting to write in negative logic).

Thus, only the DC component of the first frame is passed selectively, and written into the memory of fundamental video image information for the first frame signal.

Similarly, a signal 1103 shows the concept of operation of the selecting circuit of the second frame signal, and a signal 1104 shows the concept of operation of the selecting circuit of the n-th frame signal. The selecting circuit of each frame signal generates a signal of negative logic only when the DC component of each frame is entered as shown in FIG. 11, and selectively passes the DC component of each frame to write into the memory of fundamental video image information of each frame signal. Meanwhile, AC components of lower four bits of 7, 21, 35, 49, 63, 73 in FIG. 9 are not passed.

In the array of signal selecting circuits 101, the synchronous block counter used in each selecting circuit of frame signal can be shared, and in each selecting circuit of frame signal, only the value for decoding the synchronous block counter is different, and the army of signal selecting circuits can be realized in a simple circuit constitution.

The array of fundamental video image information memories 102 stores the DC component of each corresponding frame passing through each selecting circuit of frame signal.

In this way, when the fundamental video image information (DC component) from the first frame to the n-th frame is stored in the array of fundamental video image information memories 102, next, by the control of the control circuit of fundamental video image information 103, the fundamental video image information is read out from the array of fundamental video image information memories 102 in the sequence suited to output to the display device such as video monitor, and is sent out into the video image processing circuit 104. The control circuit of fundamental video image information 103 controls the read permit signal (read enable) of each fundamental video image information memory and read address, depending on how to monitor and issue the thumb nail image of n frames (configuration of thumb nail image in each frame in the video monitor), but since the configuration of thumb nail image in the video monitor of each frame is fixed, only the fixed sequence of reading of period of one period (reading of fundamental video image information for n fields) is repeated, and therefore the circuit may be composed easily by means of, for example, storing the read address sequence in the ROM or the like.

The video signal entering the video image processing circuit 104 is converted into a video image signal that can be displayed in the video monitor at the output end, and is issued from the output terminal of video image signal 106.

More specifically, the video signal entering the video image processing circuit 104 is converted into various video image signals suited to the video monitor at the output end, such as NTSC signal for color television, PAL signal, RGB signal, and Y/Cr/Cb signal. Not only the video image signals for ordinary color television system, it is also possible to convert into video signals to be delivered to a display device of personal computer.

As the video image processing circuit 104, the circuit widely used in the recent multi-scene television (displaying images of plural channels in one screen) can be used, and it can be realized in a simple constitution.

When displaying the video image signal processed by the video image signal processing circuit of the invention by a video image display device such as video monitor, the monitor screen is divided into n regions, and images of n frames played in the period of one frame are displayed simultaneously.

Figure 10:
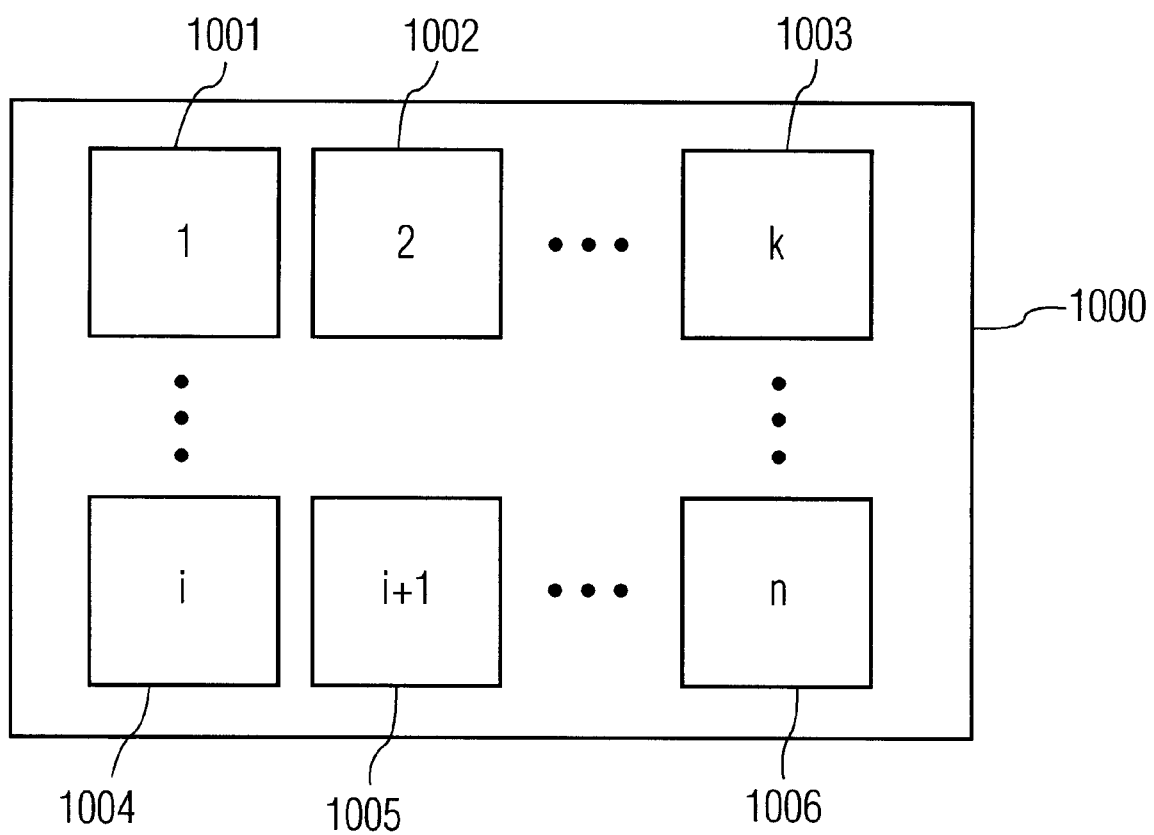
FIG. 10 is a diagram showing an example of division method of monitor screen.

As the screen dividing method for dividing the monitor screen into n regions and displaying images of n frames simultaneously, various methods may be considered, and the method shown in FIG. 10 is employed in this embodiment.

In FIG. 10, in a monitor screen 1000 (corresponding to 306 in FIG. 3), fundamental video images of n frames are displayed, and each divided screen is identified with the number representing the frame of each fundamental video image, such as 1, 2, . . . , k, . . . , i,i+1, . . , n.

As shown in FIG. 10, a screen 1001 of a first frame of a first row is disposed in an upper left position, a screen 1002 of a second frame is disposed in the right direction in the same row, and disposing sequentially in the right direction in the same row, a screen 1003 of k-th frame is disposed in an upper right position of the screen 1000, Further, the screens of the next row are arranged from the left end of the screen 1000, and in the final row, a screen 1005 of the (i+1)-th frame is disposed at the right side of the screen 1004 of the i-th frame from the lower left position, and disposing sequentially in the right direction in the same row, and a screen 1006 of the final n-th frame is disposed in the lower right position of the screen 1000. In FIG. 10, each one of the screens 1001 to 1006 corresponds to the thumb nail image shown in FIG. 8A.

The layout of the frames in FIG. 10 is only an example, and is not fixed, and it is not out of the scope of the invention if changed depending on the speed of n-times speed (value of n) or preference of the operator. In such a case, it is easy to realize by changing the reading sequence of fundamental video images from the array of fundamental video image information memories 102 in the control circuit of fundamental video image information 103.

Thus, the video image signal playing signal played at n-times speed is stored in the array of fundamental video image information memories 102, and is read out by the control of the control circuit of fundamental video image information 103, and processed in the video image processing circuit 104, and is displayed in the video monitor as shown in FIG. 10.

The array of fundamental video image information memories 102 consists of those for writing and others for reading, and by changing over writing and reading within the period of one frame, the video monitor continuously displays the fundamental video images of n frames played in the period of one frame.

At this time, the video image of the same frame number as the fundamental video image of n frames played at n-times speed in the period of each frame is displayed in the division number of the same position in the screen 1000 of the video monitor. More specifically, the first frame is displayed in 1001, the second frame in 1002, and the n-th frame in 1006, consecutively.

The invention thus explained can be realized in a simple constitution.

In the foregoing embodiment, meanwhile, only the DC component is used to display video image, but it is not out of the scope of the invention if video image is displayed by adding part of AC components aside from the DC component.

For example, in FIG. 2, suppose to display video image by fundamental video image using DC, AC1 and AC2.

In this case, in order that the signals to be passed selectively in the array of signal selecting circuits 101 may be the variable-length encoded portions of DC, AC1 and AC2 of each frame, the decoding values of the synchronous block counter and synchronous block internal counter are changed so that the selection signal shown in FIG. 11 may be negative logic, and therefore the data passing through the array of signal selecting circuits 101 and stored in the array of fundamental video image information memories 102 become DC, AC1 and AC2 of each DCT block. This is realized by determining the byte allocation to be passed from the variable-length encoding to be used.

Moreover, when reading out from the array of fundamental video image information memories 102, the control circuit for fundamental video image information 103 is controlled in the unit of synchronous block, and DC, AC1, AC2 of same DCT block are read out consecutively.

It is further realized by disposing a decoding circuit and an inverse quantizing circuit of variable-length encoding of AC1, AC2 being encoded at variable length, in the video image processing circuit 104. These circuits are not required by the number of n frames, but one circuit can be shared, so that it is realized in a very simple circuit constitution.

In the case of fundamental video image using DC component and part of AC components, as compared with the case of fundamental video signal of DC component alone, the array of fundamental video image information memories 102 must be increased in size, but since it is not necessary to store all components, as compared with the prior art of expanding and decoding to a completely uncompressed video image, it is possible to realize with a very small memory capacity. As for decoding of variable-length encoded AC component, it is enough to decode only the AC component to be used, and the circuit operation may be stopped for other parts, and hence the power consumption is small.

The inverse quantizing circuit is also required only for the portion of the AC component using the inverse quantizing table, and when the inverse quantizing table is realized, for example, by ROM, it is possible to realize with a small ROM, and hence the circuit size is small. Likely, the circuit may be operated only for the portion of the AC component to be used, and the power consumption is small.

Thus, as compared with the case of using DC component only, although the circuit size and power consumption are slightly increased, but as compared with the prior art of decoding the compressed video image completely, it is possible to realize with a very small circuit size and power consumption, and the characteristic effects of the invention are not sacrificed, and therefore it is not out of the scope of the invention when displaying the video image played at n-times speed, with fundamental video image information using DC component and part of AC components.

Incidentally, in the case n-times speed played signal is a predictive encoded signal, fundamental video image information containing predictive information is stored in the fundamental video image information memory, and the fundamental video image information is processed in the video image processing circuit 104 by using the predictive information.

The invention is also realized in a constitution in which the decoding circuit and inverse quantizing circuit of variable-length encoding are installed between the array of signal selecting circuit 101 and the array of fundamental video image information memories 102, and the result expanded by using the DC component and part of AC components is stored in the fundamental video image information memory, and in such a case, as compared with the case of decoding the compressed video image completely, it is possible to realized with a very small circuit size and power consumption, and therefore, in such constitution, it is not out of the scope of the invention when displaying the video image played at n-times speed, with fundamental video image information using DC component and part of AC components.

In the embodiment, the video image signal played at n-times speed is processed as video image signal of every frame, but the signal may be also processed as video image signal of every field. In this case, field processing may be done in odd-number field and even-number field. The fundamental video image information memory may be used as the fundamental video image information memory for field, and writing and reading may be changed over in every field.

The compressed video image signal handled in the invention may be of field internal compression, frame internal compression, or mixed compression type.

For example, in the compression type by compression between frames or between fields such as MPEG2, it is not out of the scope of the invention as far as the compressed image is complete within the frame or within the field at the input point of the video image signal processing apparatus of the invention.

In the embodiment, there are logically n signal selecting circuits in the array of signal selecting circuits 101, but the array of signal selecting circuits 101 is composed of sharable synchronous block counter, sharable synchronous block internal counter, and n decoder, and may be hence physically assembled into one circuit.

In the embodiment, there are logically n fundamental video image information memories in the array of fundamental video image information memories 102, but physically the number may be less than n, and control of write and read address may be realized to be suited to the invention. Of course physically the number n of memories is not necessarily required but address of one memory for example can be logically divided into n memories, In the embodiment, when displaying signals of n frames on the video monitor, the area of display of video image of each frame is uniform, but if not uniform, it is not out of the scope of the invention as far as conforming to the true spirit of the invention. This case may be realized easily by changing the processing of the video image processing circuit 104.

In the embodiment, the transmission format of video image signal is multiple consecutive transmission format of synchronous blocks which is widely used in digital VTR, but the transmission format is not particularly specified as far as digital signals can be transmitted. For example, Ethernet, ATM, 100BASE-T, 100VG-AnyLAN, FDDI, TPFDDI, 1EEE1394, and others used in computer network, or PCI bus, S bus, ISA bus, EISA bus, VME bus and others used in internal bus of personal computer, or SCSI, fiber channel, SSA and others used in IO of external device of computer, and others capable of transmitting video image data of plural frames in the period of one frame are not excluded from the scope of the invention as far as conforming to the true spirit of the invention.

In the embodiment, the transmission format of video image signal is the format shown in FIG. 9, but in other transmission format than the format shown in FIG. 9, it is possible to cope with by changing the timing of selection of fundamental video image in the array of signal selecting circuits 101.

EFFECTS OF THE INVENTION

According to the invention, as clear from the description herein, all video images of n frames or n fields of video image signal played at n-times speed can be distributed and displayed simultaneously on a screen divided in n regions, so that the video images of all frames or fields can be visually confirmed, and also the following effects are brought about at the same time.

All video image signals of frames or fields are not stored, but the video image is displayed by using only the fundamental video image information of compressed image, and therefore without using field memory or frame memory, the invention can be realized by using a small memory for storing only fundamental video image information.

Besides, the circuit construction is very simple because circuit for expanding and decoding the compressed signal completely into uncompressed state or circuit for reducing image is not needed, and the power consumption is very small. In particular, when only the DC component of compressed image is used, expanding and decoding circuit is not needed at all. If part of AC components is used together with DC component, the circuit size and power consumption are extremely small as compared with the case of completely expanding and decoding the compressed signal For example, decoding of variable-length encoded data may be done only in the necessary portion of AC components, and in other portions the circuit operation may be stopped and the power consumption is saved. The quantizing table may be used only in the necessary portion, and the circuit operation may be stopped in unnecessary parts and the circuit size and power consumption are reduced.

Thus, the invention is realized by a small memory and a small circuit construction, and the cost is very low.

What is claimed is:

1. A video image processing apparatus for processing a video image signal for display on a display device, the video image signal including a plurality of frames, comprising:
    means for generating a plurality of synchronous blocks corresponding to the plurality of frames, each of the plurality of synchronous blocks including a direct current (DC) signal component and an alternating current (AC) signal component of the video image signal;
    means for selecting the DC signal component from each of the plurality of synchronous blocks by sampling each of the plurality of synchronous blocks to the exclusion of at least a portion of the alternating current (AC) signal component; and
    means for simultaneously displaying in a plurality of regions of the display device the plurality of frames based on said selected DC signal component.

2. A video image processing apparatus of claim 1, further comprising:
    one of a plurality of image information memories for storing said DC signal component selected by said selecting means;
    a control circuit for controlling access to said DC signal component stored in said one of plurality of image information memories;
    an image processing circuit for converting said DC signal component into an output image signal which is displayed on the display device.

3. A video image processing apparatus of claim 1, wherein the plurality of synchronous blocks are generated at substantially n-time the playing speed of the video image signal.

4. A video image processing method for processing a video image signal for display on a display device, the video image signal including a plurality of frames, comprising the steps of:
    generating a plurality of synchronous blocks corresponding to the plurality of frames, each of the plurality of synchronous blocks including a direct current (DC) signal component and an alternating current (AC) signal component of the video image signal;
    selecting the DC signal component from each of the plurality of synchronous blocks by sampling each of the plurality of synchronous blocks to the exclusion of at least a portion of the alternating current (AC) signal component; and
    simultaneously displaying in a plurality of regions of the display device the plurality of frames based on said selected DC signal component.

5. A video image processing method of claim 4, further comprising the steps of:
    storing said selected DC signal component into one of a plurality of image information memories;
    controlling access to said DC signal component stored in said one of the plurality of image information memories; and
    converting said DC signal component into an output image signal which is displayed on the display device.

6. A video image processing method of claim 4, wherein the plurality of synchronous blocks are generated at substantially n-time the playing speed of the video image signal.

7. A video image processing apparatus of claim 1, wherein said DC and AC signal components are derived based on a discrete cosine transform (DCT) of said video image signal.

8. A video image processing apparatus of claim 7, wherein said DC component of said video image signal includes four luminance DC blocks and two color difference DC blocks.

9. A video image processing method of claim 4, wherein said DC and AC signal components are derived based on a discrete cosine transform (DCT) of said video image signal.

10. A video image processing method of claim 9, wherein said DC component of said video image signal includes four luminance DC blocks and two color difference DC blocks.

* * * * *